(12) United States Patent
Morita et al.

(10) Patent No.: US 10,900,393 B2
(45) Date of Patent: Jan. 26, 2021

(54) CONTROL DEVICE FOR INTERNAL COMBUSTION ENGINE

(71) Applicants: TOYOTA JIDOSHA KABUSHIKI KAISHA, Toyota (JP); TAIHO KOGYO CO., Ltd., Toyota (JP)

(72) Inventors: Yusuke Morita, Mishima (JP); Motoichi Murakami, Gotemba (JP); Takeshi Fukui, Toyota (JP); Yuichiro Kajiki, Toyota (JP); Katsuhiro Ashihara, Toyota (JP); Alan Hase, Ageo (JP); Takashi Izumi, Nagakute (JP)

(73) Assignees: TOYOTA JIDOSHA KABUSHIKI KAISHA, Toyota (JP); TAIHO KOGYO CO., Ltd., Toyota (JP)

( * ) Notice: Subject to any disclaimer, the term of this patent is extended or adjusted under 35 U.S.C. 154(b) by 0 days.

(21) Appl. No.: 16/239,608

(22) Filed: Jan. 4, 2019

(65) Prior Publication Data
US 2019/0226366 A1 Jul. 25, 2019

(30) Foreign Application Priority Data
Jan. 25, 2018 (JP) .................................. 2018-010725

(51) Int. Cl.
*F01M 1/16* (2006.01)
*F01M 9/10* (2006.01)
(Continued)

(52) U.S. Cl.
CPC ................ *F01M 1/16* (2013.01); *F01M 1/06* (2013.01); *F01M 9/102* (2013.01);
(Continued)

(58) Field of Classification Search
None
See application file for complete search history.

(56) References Cited

U.S. PATENT DOCUMENTS 5,339,776 A * 8/1994 Regueiro ................. F01M 1/16
123/196 AB
9,500,107 B2 * 11/2016 Takahata .................... F01L 1/34
123/90.15
(Continued)

FOREIGN PATENT DOCUMENTS

JP 61-212757 9/1986
JP 3-245053 10/1991
(Continued)

*Primary Examiner* — Patrick Hamo
*Assistant Examiner* — Wesley G Harris
(74) *Attorney, Agent, or Firm* — Oblon, McClelland, Maier & Neustadt, L.L.P.

(57) ABSTRACT

A control device controls an internal combustion engine including: an elastic wave sensor arranged and configured to output a signal responsive to the strength of an acoustic emission wave produced at a sliding portion; and a variable oil pump. The control device is configured to execute an oil pressure control such that the oil pressure approaches a target oil pressure according to an engine operating condition. This oil pressure control includes a first pressure-increase processing executed where an AE correlation value correlated with the strength or occurrence frequency of the acoustic emission wave detected by the elastic wave sensor is greater than a first threshold value. The first pressure-increase processing increases the target oil pressure associated with a first engine operating condition present when the AE correlation value becomes greater than the first threshold value, as compared to when the AE correlation value is not greater than that.

8 Claims, 10 Drawing Sheets

(51) Int. Cl.
*F01M 1/06* (2006.01)
*G01M 15/00* (2006.01)
*G01M 13/045* (2019.01)
*G01M 15/09* (2006.01)
*G01M 15/12* (2006.01)
*F01M 1/02* (2006.01)
*F01M 11/02* (2006.01)

(52) U.S. Cl.
CPC .......... *G01M 13/045* (2013.01); *G01M 15/00* (2013.01); *G01M 15/09* (2013.01); *G01M 15/12* (2013.01); *F01M 2001/0246* (2013.01); *F01M 2011/026* (2013.01); *F01M 2250/00* (2013.01); *F16C 2233/00* (2013.01)

(56) References Cited

U.S. PATENT DOCUMENTS

| | | | | |
|---|---|---|---|---|
| 2002/0013635 A1* | 1/2002 | Gotou | ................ | G01M 13/045 700/108 |
| 2002/0172604 A1* | 11/2002 | Berger | ................ | F04B 49/035 417/307 |
| 2014/0007657 A1* | 1/2014 | Matsubara | ............ | G01M 13/04 73/53.05 |
| 2016/0313228 A1* | 10/2016 | Thomson | ............... | G01N 33/30 |

FOREIGN PATENT DOCUMENTS

| | | |
|---|---|---|
| JP | 2017-190681 | 10/2017 |
| JP | 2017-194414 | 10/2017 |

\* cited by examiner

CONTROL DEVICE FOR INTERNAL COMBUSTION ENGINE

CROSS-REFERENCE TO RELATED APPLICATION

This application is based on and claims the benefit of Japanese Patent Application No. 2018-010725, filed on Jan. 25, 2018, which is incorporated by reference herein in its entirety.

BACKGROUND

Technical Field

The present disclosure relates to a control device for an internal combustion engine, and more particularly to a control device that executes an oil pressure control for controlling an engine oil pressure based on an acoustic emission wave.

Background Art

For example, JP S61-212757 A discloses an abnormality monitoring device for an internal combustion engine that uses an acoustic emission wave. More specifically, a sensor for detecting an acoustic emission wave is installed in the vicinity of an abnormality monitoring target portion (for example, cylinder liner) of this internal combustion engine.

Furthermore, the abnormality monitoring device is configured, when the output electric voltage of this sensor becomes greater than a threshold value, to determine that the abnormality monitoring target portion is abnormal.

SUMMARY

According to the abnormality monitoring device disclosed in JP S61-212757 A, it can be determined whether or not an abnormality monitoring target portion of an internal combustion engine is abnormal by the use of the acoustic emission wave (AE wave). However, an engine control according to the results of detection of the acoustic emission wave is not disclosed in JP S61-212757 A. The technique disclosed in JP S61-212757 A therefore still has room for improvement in terms of the engine control.

The present disclosure has been made to address the problem described above, and an object of the present disclosure is to provide a control device for an internal combustion engine that can execute an oil pressure control that is capable of reducing the decrease in reliability of the internal combustion engine by the use of an acoustic emission wave detected by an elastic wave sensor.

A control device for controlling an internal combustion engine according to the present disclosure is configured to control an internal combustion engine that includes:

an elastic wave sensor arranged near a sliding portion of the internal combustion engine and configured to output a signal responsive to strength of an acoustic emission wave produced at the sliding portion; and a variable oil pump configured to change an oil pressure of oil lubricating the sliding portion.

The control device is configured to execute an oil pressure control for controlling the variable oil pump such that the oil pressure approaches a target oil pressure according to an engine operating condition.

The oil pressure control includes a first pressure-increase processing executed where an AE correlation value correlated with the strength or occurrence frequency of the acoustic emission wave detected by the elastic wave sensor is greater than a first threshold value.

The first pressure-increase processing increases the target oil pressure associated with a first engine operating condition present when the AE correlation value becomes greater than the first threshold value, as compared to when the AE correlation value is smaller than or equal to the first threshold value.

The first pressure-increase processing may increase not only the target oil pressure associated with the first engine operating condition but also the target oil pressure associated with an engine operating condition included in an engine operating region in which at least one of an engine speed and an engine torque correlation value is higher than that at the first engine operating condition.

The oil pressure control may include a pressure-decrease processing that, where a steady condition that an engine speed and an engine torque correlation value are constant or substantially constant with respect to a lapse of time is met, decreases, with a lapse of time, the target oil pressure associated with an engine operating condition at the steady condition being met.

The control device may be configured, where the AE correlation value is greater than a second threshold value that is greater than the first threshold value, to execute an operation limit processing. The operation limit processing may limit operation of the internal combustion engine such that the internal combustion engine is operated in an engine operating region in which each of an engine speed and an engine torque correlation value is lower than that at a second engine operating condition present when the AE correlation value becomes greater than the second threshold value.

The control device may execute a failure detection processing for detecting a failure of the elastic wave sensor. The oil control may include a second pressure-increase processing that, where the failure has been detected by the failure detection processing, decreases the target oil pressure associated with a same engine operating condition, as compared to when the failure has not occurred.

According to the control device for an internal combustion engine of the present disclosure, the target oil pressure of the oil pressure control using the variable oil pump is changed based on the AE correlation value correlated with the strength or occurrence frequency of the acoustic emission wave (AE wave) detected by the elastic wave sensor. In detail, where the AE correlation value is greater than a threshold value (first threshold value), the target oil pressure associated with an engine operating condition (first engine operating condition) present when the AE correlation value becomes greater than the threshold value is increased, as compared to when the AE correlation value is smaller than or equal to the threshold value. This makes it possible to increase the amount of oil supplied to the sliding portion at the engine operating condition at which an increase of the AE correlation value is recognized. As just described, the control device of the present disclosure can execute the oil pressure control that can reduce the decrease in reliability of the internal combustion engine by the use of the AE wave.

DETAILED DESCRIPTION

Figure 1:
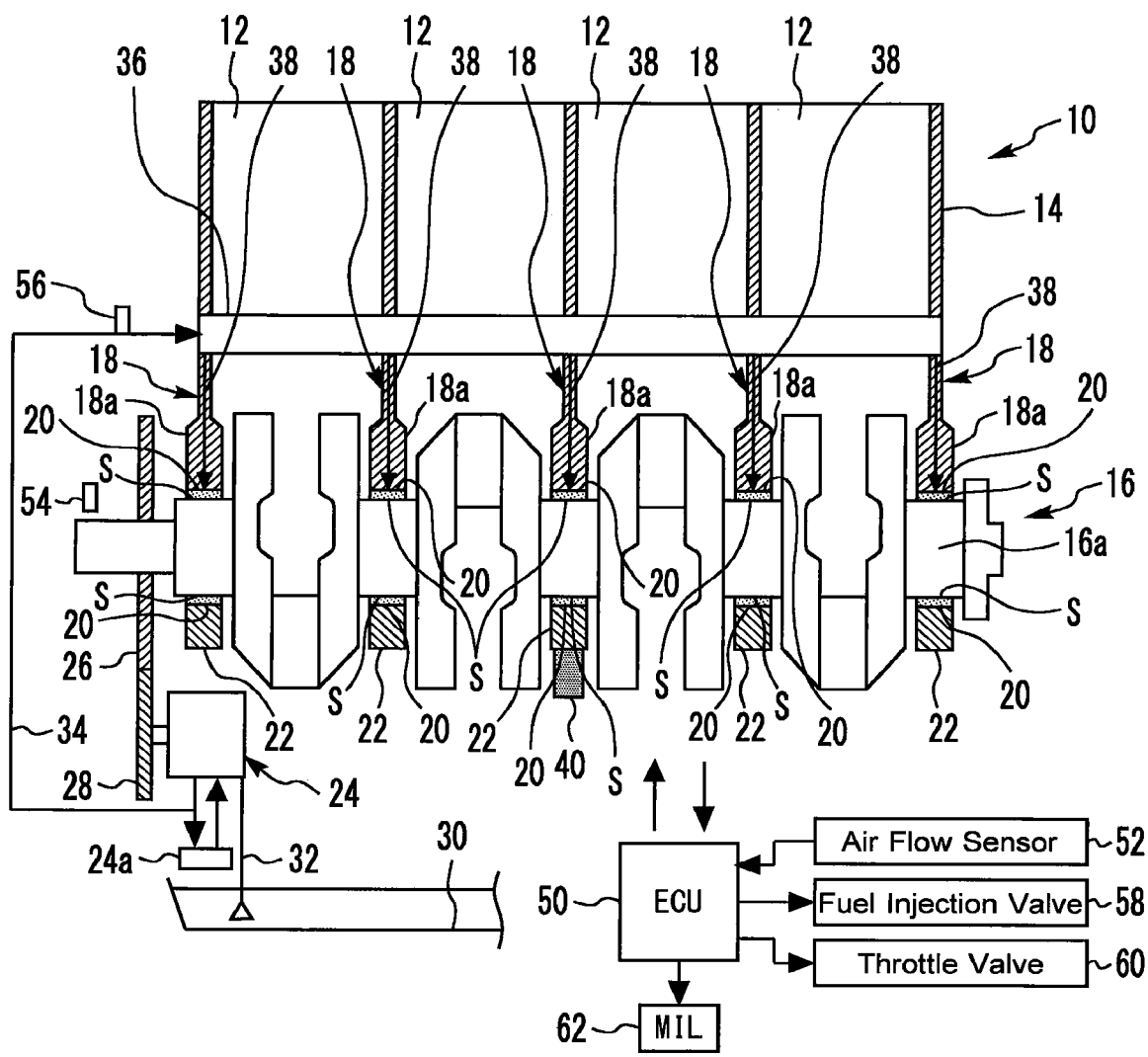
FIG. 1 is a schematic diagram for describing an example of the configuration of a system according to a first embodiment of the present disclosure.

In the following, embodiments of the present disclosure are described with reference to the accompanying drawings. However, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Further, structures or steps or the like that are described in conjunction with the following embodiments are not necessarily essential to the present disclosure unless explicitly shown otherwise, or unless the present disclosure is explicitly specified by the structures, steps or the like theoretically.

First Embodiment

Firstly, a first embodiment according to the present disclosure and modification examples thereof will be described with reference to FIGS. 1 to 5.
1-1. Example of Configuration of System Fig. is a schematic diagram for describing an example of the configuration of a system according to the first embodiment of the present disclosure. The system according to the present embodiment includes an internal combustion engine 10. The internal combustion engine 10 is equipped with a cylinder block 14 in which four cylinders 12 are formed. The number and arrangement of cylinders of the internal combustion engine 10 are not particularly limited. In addition, although the internal combustion engine 10 is, as an example, a spark ignition engine, the present disclosure can also be applied to a compression ignition engine.

The internal combustion engine 10 is equipped with a crankshaft 16 that is coupled to a piston (not shown) of each cylinder 12 via a connecting rod (not shown). The cylinder block 14 includes, inside thereof, a plurality of bulkheads 18 that are formed so as to separate the respective cylinders 12 from each other. The crankshaft 16 includes a main journal 16a at a location that is associated with each of the plurality of bulkheads 18.

The crankshaft 16 is rotatably supported by a plurality pairs of halved main bearings 20. In more detail, the halved main bearings 20 are respectively attached to the support portions 18a of the bulkheads 18 associated with the main journals 16a and also respectively attached to crank caps 22 opposed to the support portions 18a. Moreover, each of the main journal 16 as is supported by the support portion 18a and the crank cap 22 via a pair of main bearings 20.

A sliding portion S is provided, for each main journal 16a, between the outer circumferential surface of the main journal 16a and the inner circumferential surface of the pair of main bearings 20. It should be noted that, in the example shown in FIG. 1, this sliding portion S corresponds to an example of the "sliding portion" according to the present disclosure.

Moreover, the internal combustion engine 10 is equipped with a variable oil pump (hereunder, simply abbreviated to an "oil pump") 24 for supplying an oil (lubrication oil) with each portion of the internal combustion engine 10. The oil pump 24 is coupled to the crankshaft 16 via a pair of gears 26 and 28 and is driven to rotate by a torque outputted from the crankshaft 16.

The oil pump 24 is a variable displacement oil pump. That is to say, the oil pump 24 is equipped with a variable displacement device that is capable of changing the discharge rate of the oil (that is, the displacement of pump) in order to change the oil pressure supplied to each portion of the internal combustion engine 10.

An example of the variable displacement device described above is the oil pump 24 of a trochoid type which includes an oil control valve (OCV) 24a, an outer rotor and an inner rotor, and which is configured to control the oil pressure in a control chamber (not shown) by the use of the OCV 24a to adjust the eccentric amount of the outer rotor with respect to the inner rotor. According to the oil pump 24 configured as above, the discharge rate of the oil can be continuously controlled. It should be noted that the details of the oil pump equipped with this kind of variable displacement device is disclosed in JP 2017-190681 A, for example.

The oil pump 24 draws the oil stored in an oil pan 30 via an oil strainer 32. The oil discharged from the oil pump 24 is supplied to a main gallery 36 through an oil passage 34. The oil is supplied to each portion of the internal combustion engine 10 from the main gallery 36.

One of oil passages that communicate with the main gallery 36 is an oil passage 38 for the crankshaft 16. The oil passage 38 is connected to the sliding portion S through the bulkheads 18 (including the support portions 18a) of the cylinder block 14 and the main bearings 20. Thus, the oil pressure supplied to the sliding portion S can be changed by controlling the OCV 24a to change the discharge rate of the oil pump 24.

It should be noted that the variable oil pump that makes variable the oil pressure of the oil that circulates the "sliding portion" according to the present disclosure may alternatively be an electrically-driven type, instead of the type described above. In an example of the electrically-driven oil pump, the oil pressure can be freely controlled without depending on engine speed Ne.

Moreover, the internal combustion engine 10 is equipped with an elastic wave sensor 40 that outputs a signal responsive to the strength of an "acoustic emission wave" (hereunder, referred to as an "AE wave") that is produced at the sliding portion S described above. The acoustic emission is a phenomenon in which a strain energy that has been stored inside a material is released as an AE wave that is an elastic wave when the material deforms or is destroyed.

The elastic wave sensor 40 is installed in the vicinity of the sliding portion S. In more detail, in the example shown in FIG. 1, the elastic wave sensor 40 is attached to the crank cap 22 of one cylinder (representative cylinder) 12. However, instead of this kind of example, the elastic wave sensor 40 may alternatively be, for example, attached to the crank cap 22 of each cylinder 12.

It should be noted that a sliding portion subject to evaluation of the AE wave is not limited to the sliding portion S described above, as long as it is a portion to which the oil pressure that is made variable by the oil pump 24 is supplied. That is to say, the "sliding portion" according to the present disclosure may alternatively be, for example, a sliding portion between a piston and a cylinder bore, and the elastic wave sensor may thus alternatively be attached to a cylinder liner having the cylinder bore, or a cylinder block that covers the cylinder liner. In addition, in an example in which a sliding portion between a camshaft and a camshaft support member subject to the evaluation, the elastic wave sensor may alternatively be, for example, attached to the camshaft support member, such as a cam cap.

As shown in FIG. 1, the system according to the present embodiment further includes an electronic control unit (ECU) 50. Various sensors installed in the internal combustion engine 10 and various actuators for controlling the operation of the internal combustion engine 10 are electrically connected to the ECU 50.

The various sensors described above include an air flow sensor 52, a crank angle sensor 54 and an oil pressure sensor 56 in addition to the elastic wave sensor 40 described above. The air flow sensor 52 outputs a signal responsive to the flow rate of intake air taken into an intake air passage. The crank angle sensor 54 outputs a signal responsive to crank angle. The ECU 50 can calculate the engine speed Ne by the use of the signals of the crank angle sensor 54. In addition, an engine load factor which corresponds to an example of an "engine torque correlation value" correlated with the engine torque can be calculated on the basis of the intake air flow rate obtained by the use of the air flow sensor 52 and the engine speed Ne. The oil pressure sensor 56 outputs a signal responsive to the pressure of the oil that flows through a lubrication system of the internal combustion engine 10 (engine oil pressure). As an example, the oil pressure sensor 56 is attached to a portion of the oil passage 34 located upstream of the main gallery 36. According to the oil pressure sensor 56, an engine oil pressure value that correlates with the oil pressure of the oil that lubricates the sliding portion S described above can be obtained.

Moreover, the various actuators described above include fuel injection valves 58 for supplying fuel in the respective cylinders 12, and a throttle valve (60) for controlling the intake air flow rate, in addition to the oil pump 24 (OCV 24a) described above. Furthermore, a malfunction indicator lamp (MIL) 62 for notifying the driver of a malfunction concerning the sliding portion S is installed in the vehicle on which the internal combustion engine 10 is mounted. The MIL 62 is electrically connected to the ECU 50.

The ECU 50 is equipped with a processor, a memory, and an input/output interface. The input/output interface receives sensor signals from the various sensors described above, and also outputs actuating signals to the various actuators described above. In the memory, various control programs and maps for controlling the various actuators are stored. The processor reads out a control program from the memory and executes the control program. As a result, functions of the "control device for an internal combustion engine" according to the present embodiment are achieved.

1-2. Oil Pressure Control According to First Embodiment

The ECU 50 executes an "oil pressure control" for controlling the oil pump 24 to cause the actual oil pressure to approach a target oil pressure depending on an engine operating condition, during operation of the internal combustion engine 10. The actual oil pressure used in this oil pressure control is, for example, the oil pressure detected by the oil pressure sensor 56 (i.e., the oil pressure supplied to the main gallery 36). In detail, this oil pressure control is executed by, for example, performing a feedback control calculation as described below.

That is to say, a difference between the oil pressure detected by the oil pressure sensor 56 and the target oil pressure is calculated. Also, a target value of the discharge rate of the oil pump 24 that is required to cause a detected oil pressure to converge to the target oil pressure is calculated as a value depending on the calculated difference. Then, the oil pressure in the above-described control chamber of the oil pump 24 is calculated on the basis of a target value of this discharge rate. Then, an electric current value of the OCV 24a that is required for the OCV 24a to output the oil pressure in this control chamber is calculated. The ECU 50 controls the energization of the OCV 24a such that this electric current value flows through the OCV 24a.

As a result, since the discharge rate of the oil pump 24 is caused to approach the target value, the actual oil pressure gradually converges to the target oil pressure. It should be noted that the correspondence relationship between the discharge rate of the oil pump 24, the oil pressure in the control chamber and the electric current value of the OCV 24a is determined in advance by, for example, an experiment, and is stored in an ROM of the ECU 50 as a map. The ECU 50 calculates the electric current value of the OCV 24a for achieving the target value of the discharge rate with reference to this kind of map.

1-2-1. Example of Setting of Target Oil Pressure

Figure 2:
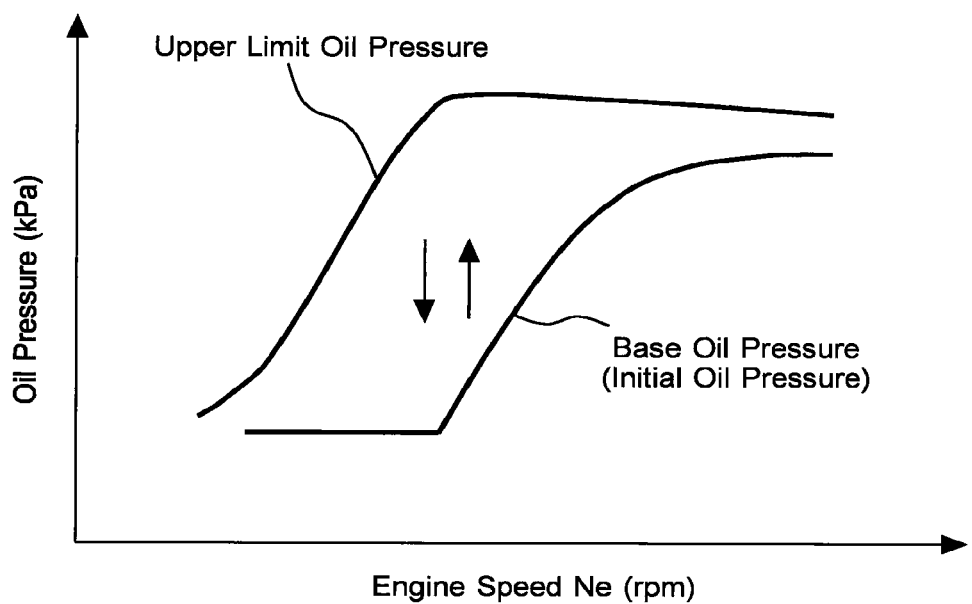
FIG. 2 is a graph that illustrates an example of the setting of a target oil pressure used in an oil pressure control.

FIG. 2 is a graph that illustrates an example of the setting of the target oil pressure used in the oil pressure control. The target oil pressure is determined on the basis of the engine operating condition (mainly, the engine speed Ne and the engine torque correlation value (engine load factor)). In FIG. 2, a relationship between the engine speed Ne and the target oil pressure is represented.

The target oil pressure in each engine speed Ne is changed within a range from a base oil pressure to an upper limit oil pressure as shown in FIG. 2. In more detail, if a first pressure-increase processing described later is not performed, the base oil pressure (i.e., initial oil pressure) is used as the target oil pressure.

As shown in FIG. 2, in a low-engine-speed range that is lower than or equal to a designated value, the higher the engine speed Ne is, the higher the upper limit oil pressure becomes. In a high-engine-speed range that is higher than the designated value described above, the upper limit oil pressure is set so as to be constant. It should be noted that this kind of oil pressure characteristics are equivalent to a general characteristics of an oil pump that is driven by a torque outputted from a crankshaft without using a variable displacement device.

On the other hand, the base oil pressure has characteristics that the oil pressure basically becomes higher when the engine speed Ne is higher than when the engine speed Ne is lower. On that basis, in the example shown in FIG. 2, the base oil pressure is basically set so as to entirely become lower than the upper limit oil pressure, and, especially in a range located on the lower engine speed side, the amount of decrease of the oil pressure with respect to the upper limit oil pressure is set so as to become greater.

When the engine speed Ne becomes lower, the reliability of the internal combustion engine 10 (i.e., prevention of seizure of a sliding portion, such as the sliding portion S) can be easier to be ensured without relying on a high oil pressure as compared to when the engine speed Ne is higher. Thus, according to the characteristics of the base oil pressure as exemplified in FIG. 2, waste work (i.e., excess oil pressure in terms of the reliability) in the characteristics of the upper limit oil pressure can be decreased by lowering the discharge rate (i.e., the displacement of the pump) of the oil pump 24 to lower the oil pressure particularly in a range located on the lower engine speed side. According to the characteristics of this kind of the base oil pressure, since the mechanical loss of the internal combustion engine 10 can be reduced, a superior oil pressure characteristics in terms of the fuel efficiency can be achieved.

Furthermore, the base oil pressure is set so as to also change depending on the engine torque correlation value, although this is not represented in FIG. 2. As an example of this kind of setting, the base oil pressure according to the present embodiment is set such that, in a low-load range in which the engine load factor is smaller than or equal to a designated value, values of the oil pressure under the same engine speed Ne become lower than those in a high load range in which it is higher than this designated value. Similarly to the above-described explanation concerning the engine speed Ne, when the engine torque correlation value becomes lower, the reliability of the internal combustion engine 10 can be easier to be ensured without relying on a high oil pressure, as compared to when the engine torque correlation value is higher. Therefore, according to the setting of the base oil pressure described above in terms of the engine torque correlation value, the mechanical loss of the internal combustion engine 10 can also be reduced, and a superior oil pressure characteristics in terms of the fuel efficiency can also be achieved.

It should be noted that the engine operating condition used to define the target oil pressure may appropriately include a parameter other than the engine speed Ne and the engine torque correlation value.

1-2-2. First Pressure-Increase Processing (Oil Pressure Control Using AE Wave)

The oil pressure control according to the present embodiment includes a "first pressure-increase processing" that changes the target oil pressure from the base oil pressure. To be more specific, this first pressure-increase processing is executed where an "AE correlation value" correlated with the strength or occurrence frequency of the AE wave detected by the elastic wave sensor 40 becomes greater than a threshold value TH1 (which corresponds to an example of the "first threshold value" according to the present disclosure).

Figure 3:
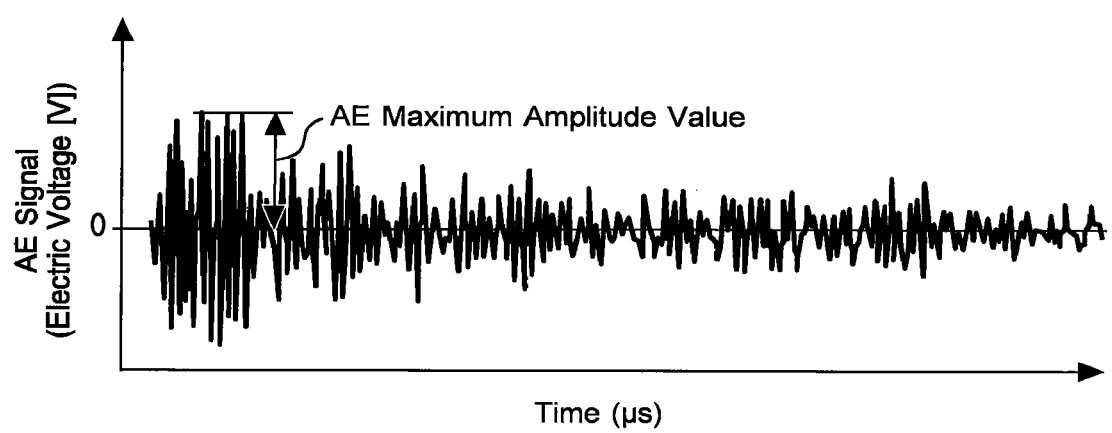
FIG. 3 is a graph for describing an example of an AE correlation value of an AE wave used in the first embodiment of the present disclosure.

FIG. 3 is a graph for describing an example of the AE correlation value of the AE wave used in the first embodiment of the present disclosure. FIG. 3 represents a waveform of the acoustic emission wave (AE signal waveform) obtained by the use of the elastic wave sensor 40. Although the waveform itself of output signal of the elastic wave sensor 40 may be used as the AE signal waveform, a waveform after performing a signal amplification processing with an amplifier and a filter processing for removing noise is generally used as the AE signal waveform. The waveform shown in FIG. 3 also corresponds to the AE signal waveform after these kinds of processing are performed by the ECU 50.

The horizontal axis of FIG. 3 is time, and, in more detail, FIG. 3 represents a change of the AE signal waveform during a very small time period in the order of microseconds. When the AE wave is produced, the AE signal becomes greater and then shows a peak value and thereafter attenuates. The AE signal waveform is obtained as a result of a single AE wave being measured or a plurality of AE waves being continuously measured. The example shown in FIG. 3 represents the latter AE signal waveform.

What the amplitude value of the AE signal (electric voltage [V]) is greater means that an energy that is released at a generation source of the acoustic emission (i.e., at a portion of the main journal 16a of the crankshaft 16 at which a phenomenon, such as friction, has occurred) becomes greater. Because of this, when, for example, the friction of the crankshaft 16 becomes greater, the strength of the AE wave becomes greater. Therefore, by detecting the AE wave by the use of the elastic wave sensor 40 to obtain the strength thereof, an information that indicates an omen of seizure of the sliding portion S (i.e., the degree of increase of the friction at the sliding portion S, for example) can be evaluated during operation of the internal combustion engine 10 before the seizure of the sliding portion S occurs.

According to the present embodiment, an AE maximum amplitude value that is an example of the AE correlation value correlated with the strength of the AE wave is used as an example of the AE correlation value correlated with the strength or occurrence frequency of the AE wave. The AE maximum amplitude value is a maximum value of the amplitude of the AE signals that are measured during a predetermined time period (for example, a control time interval of a routine shown in FIG. 5 described later).

The first pressure-increase processing according to the present embodiment is executed, when the AE maximum amplitude value becomes greater than the threshold value TH1, to more increase the target oil pressure associated with an intended engine operating condition as compared to when the AE maximum amplitude value is smaller than or equal to the threshold value TH1.

Figure 4:
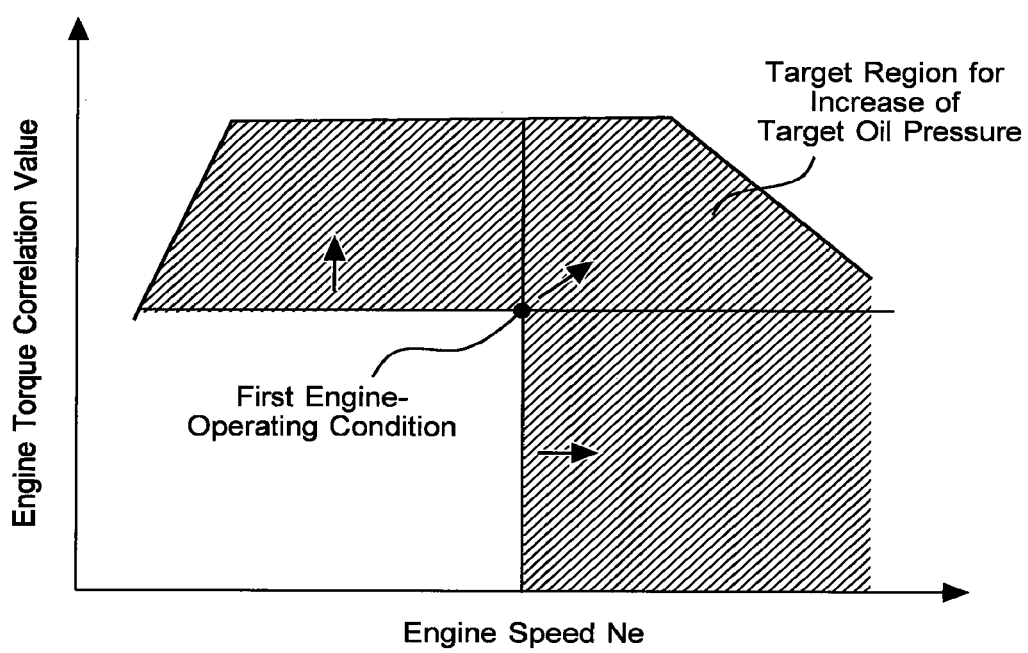
FIG. 4 is a graph for describing an engine operating condition subject to an increase of the target oil pressure by a first pressure-increase processing.

FIG. 4 is a graph for describing the engine operating condition subject to an increase of the target oil pressure by the first pressure-increase processing. The engine operating conditions subject to the increase of the target oil pressure includes not only an engine operating condition present when the AE maximum amplitude value becomes greater than the threshold value TH1 (for ease of explanation, referred to as a "first engine operating condition") but also, as shown in FIG. 4, an engine operating condition included in an engine operating region in which at least one of the engine speed Ne and the engine torque correlation value is higher than that in the first engine operating condition. Namely, the increase of the target oil pressure is also directed to an engine operating condition that is severer than the first engine operating condition in terms of ensuring the reliability of the internal combustion engine 10 due to the fact that at least one of the engine speed Ne and the engine torque correlation value is higher than that in the first engine operating condition.

1-2-3. Processing of ECU Concerning Oil Pressure Control

Figure 5:
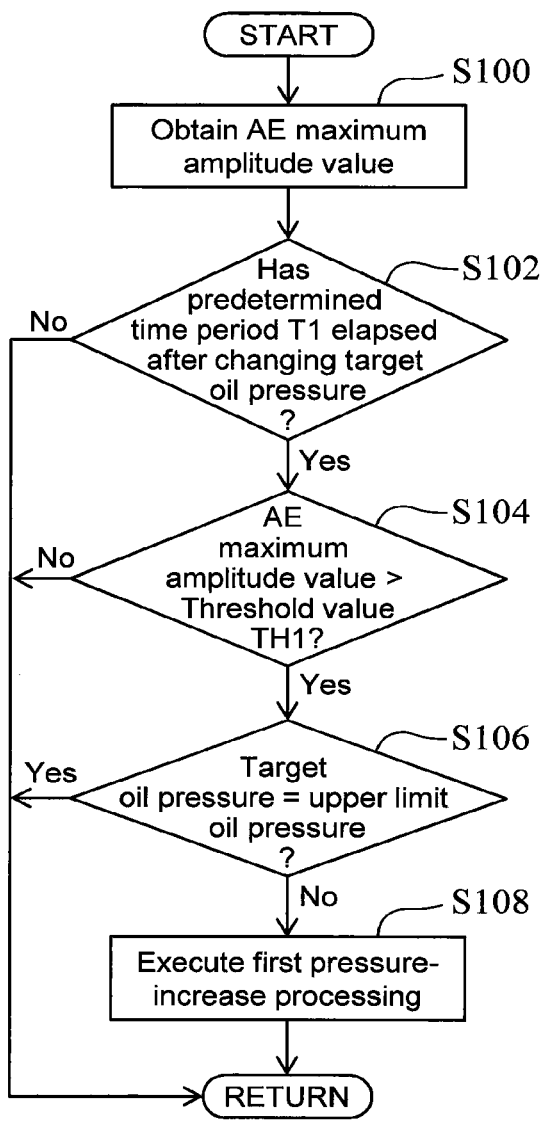
FIG. 5 is a flow chart that illustrates a routine of the processing concerning the oil pressure control according to the first embodiment of the present disclosure.

FIG. 5 is a flow chart that illustrates a routine of the processing concerning the oil pressure control according to the first embodiment of the present disclosure. The ECU 50 repeatedly executes the present routine at a predetermined control time interval (for example, several milliseconds).

According to the routine shown in FIG. 5, firstly, the ECU 50 obtains an AE maximum amplitude value on the basis of the outputs of the elastic wave sensor 40 (step S100). In more detail, the ECU 50 continuously monitors the output of the elastic wave sensor 40 and calculates a maximum value of the amplitude of the AE signal waveform (i.e., AE maximum amplitude value) for each predetermined time (for example, the control time interval of the present routine). It should be noted that, if the internal combustion engine 10 is in operation, the AE signal (electric voltage) is not continuously zero even when an increase of the friction at the sliding portion S is not yet in progress, and the AE signal shows a very small value.

Next, the ECU 50 determines whether or not a predetermined time period T1 from a time point of the latest change of the target oil pressure has elapsed (step S102). This predetermined time period T1 is set, for example, so as to be longer than a time period from a time point of change of the target oil pressure until a change of the actual oil pressure of the oil supplied to the sliding portion S is seen. If the determination result of step S102 is negative, the ECU 50 ends the current processing cycle.

If, on the other hand, the determination result of step S102 is positive, the ECU 50 determines whether or not the AE maximum amplitude value has become greater than the threshold value TH1 (step S104). The threshold value TH1 is set in advance as a value for judging that a significant increase of the friction has proceeded at the sliding portion S.

If the determination result of step S104 is negative (AE maximum amplitude value≤threshold value TH1), the ECU 50 ends the current processing cycle. If, on the other hand, the determination result of step S104 is positive (AE maximum amplitude value>threshold value TH1), the ECU 50 proceeds to step S106. The ECU 50 stores a map that defines a relationship between each of the base oil pressure (initial oil pressure) and upper limit oil pressure, and the engine operating condition (engine speed Ne and engine load factor as an example). One example of the relationship between the engine speed Ne and the base oil pressure in this map is as shown in FIG. 2.

In step S106, the ECU 50 determines whether or not the current target oil pressure in the engine operating condition at a time point at which the determination of step S104 is made (that is, the first engine operating condition) is the same as the upper limit oil pressure associated with the first engine operating condition.

If the ECU 50 determines in step S106 that the target oil pressure is the same as the upper limit oil pressure, it ends the current processing cycle. If, on the other hand, the ECU 50 determines in step S106 that the target oil pressure has not yet reached the upper limit oil pressure, it proceeds to step S108. In step S108, the ECU 50 executes the first pressure-increase processing. In detail, the value of the target oil pressure associated with the first engine operating condition is increased by a predetermined amount ΔP1 from a value of the current target oil pressure associated with the first engine operating condition, as an example. Similarly, the values of the target oil pressure associated with engine operating conditions included in an engine operating region in which at least of one of the engine speed Ne and the engine load factor is higher than that at the first engine operating condition are each increased by the predetermined amount ΔP1 from values of the target oil pressure associated with the respective engine operating conditions.

If the target oil pressure is changed by the processing of step S108, the oil pump 24 (OCV24a) is controlled such that the oil pressure detected by the oil pressure sensor 56 approaches a target oil pressure after the change. Moreover, according to the present routine, if the determination result of step S104 becomes positive again after the target oil pressure is increased by the first pressure-increase processing, the values of the target oil pressure are each increased again by the predetermined amount ΔP1 described above, as long as the values of the target oil pressure at the engine operating conditions subject to the first pressure-increase processing have not yet reached the respective values of the upper limit oil pressure.

Furthermore, for example, the values of the target oil pressure that have been changed by the first pressure-increase processing may be stored in the ECU 50 and be continuously used after the next engine start-up. Alternatively, for example, the target oil pressure may be reset to the base oil pressure (initial oil pressure) when the operation of the internal combustion engine 10 is stopped. That is to say, each time when the engine start-up is done, the base oil pressure (initial oil pressure) may be used as the target oil pressure and the first pressure-increase processing may be executed as needed.

1-2-4. Advantageous Effects Concerning Oil Pressure Control

According to the oil pressure control of the present embodiment described so far, the first pressure-increase processing is executed where the AE maximum amplitude value becomes higher than the threshold value TH1, that is, where it is judged that the omen of the seizure due to an increase of the friction at the sliding portion S is seen.

The first pressure-increase processing increases not only the value of the target oil pressure associated with the first engine operating condition present when the AE maximum amplitude value becomes greater than the threshold value TH1 but also the values of the target oil pressure associated with the engine operating conditions included in the engine operating region in which at least one of the engine speed Ne and the engine load factor is higher than that at the first engine operating condition. As a result, the amount of the oil supplied to the sliding portion S can be increased during use of the first engine operating condition and also the engine operating conditions that are severer than the first engine operating condition in terms of ensuring the reliability of the internal combustion engine 10. Therefore, the decrease in reliability of the internal combustion engine 10 (seizure of the crankshaft 16) can be effectively reduced.

Consequently, according to the oil pressure control of the present embodiment, the decrease in reliability of the internal combustion engine 10 can be reduced when there is a concern about the decrease in the reliability while basically using, as the target oil pressure, an oil pressure that is lower than the upper limit oil pressure to decrease the mechanical loss of the internal combustion engine 10. In addition, due to sudden causes, such as contamination of foreign matter (for example, chip or deposits) to the sliding portion S, the decrease in reliability of the internal combustion engine 10 may be similarly concerned during operation of the internal combustion engine 10. Even when this kind of contamination of foreign matter occurs, the AE maximum amplitude value increases. Because of this, according to the oil pressure control of the present embodiment, the decrease in reliability of the internal combustion engine 10 due to this kind of sudden causes can also be reduced.

1-3. Modification Examples Concerning First Embodiment
1-3-1. Another Example of Manner of Increase of Target Oil Pressure According to the first pressure-increase processing of the first embodiment described above, each time when the AE maximum amplitude value becomes greater than the threshold value TH1, the values of the target oil pressure associated with the engine operating conditions subject to the first pressure-increase processing are each increased by the predetermined amount ΔP1. However, instead of this kind of example, where the AE maximum amplitude value has become greater than the threshold value TH1, the first pressure-increase processing may alternatively be, for example, executed so as to increase the values of the target oil pressure subject to the increase to the respective values of the upper limit oil pressure at once.

1-3-2. Another Example of Engine Operating Condition Subject to First Pressure-Increase Processing In the first embodiment described above, the increase of the target oil pressure is directed to not only the first engine operating condition present when the AE maximum amplitude value becomes greater than the threshold value TH1 but also the engine operating conditions included in the engine operating region in which at least one of the engine speed Ne and the engine load factor is higher than that at the first engine operating condition. However, the "first pressure-increase processing" according to the present disclosure may be performed for at least the first engine operating condition of the plurality of engine operating conditions described above.

Second Embodiment

Next, a second embodiment according to the present disclosure and a modification example thereof will be described with reference to FIGS. 6 and 7. It should be noted that, in the following description, the configuration shown in FIG. 1 is supposed to be used as an example of the configuration of a system according to the second embodiment. This also applies to the configuration of systems according to third to fifth embodiments described later.

2-1. Oil Pressure Control According to Second Embodiment

The oil pressure control according to the present embodiment is mainly different from the oil pressure control according to the first embodiment in terms of including the following "pressure-decrease processing" as well as the first pressure-increase processing.

Since, if the operation time of the internal combustion engine 10 becomes longer, the surface roughness of the sliding portion S becomes smaller (that is, the fitting in of the sliding portion S proceeds), the AE correlation value, such as the AE maximum amplitude value, becomes difficult to increase even when the oil pressure is decreased. According to the pressure-decrease processing described above, when a "steady condition" that the engine speed Ne and the engine torque correlation value are constant or substantially constant with respect to a lapse of time is met, the target oil pressure is gradually decreased with a lapse of time.

To be more specific, according to the pressure-decrease processing, each time when a duration T2 elapses under the condition that the steady condition is met, the target oil pressure is decreased by a predetermined amount ΔP2, provided that the target oil pressure has not yet reached a predetermined lower limit value. The duration T2 corresponds to a duration of the steady condition from a time point at which the steady condition is met last. The engine operating condition subject to a decrease of the target oil pressure corresponds to the steady condition that is currently met.

2-1-1. Example of Operation Including Pressure-Decrease Processing

Figure 6:
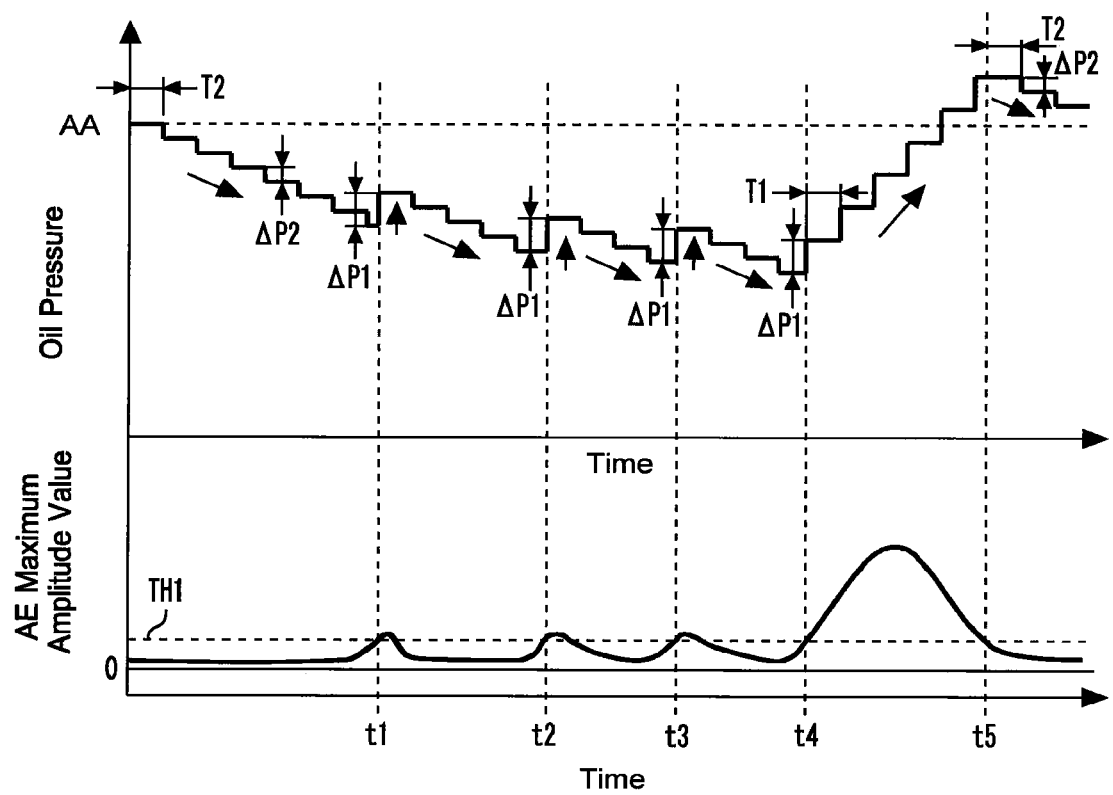
FIG. 6 is a time chart that illustrates an example of an operation of an oil pressure control according to a second embodiment of the present disclosure, which includes a pressure-decrease processing in addition to the first pressure-increase processing.

FIG. 6 is a time chart that illustrates an example of the operation of the oil pressure control according to the second embodiment of the present disclosure, which includes the pressure-decrease processing in addition to the first pressure-increase processing. According to the example shown in FIG. 6, the oil pressure control is executed under the condition that the steady condition described above is continuously met.

The target oil pressure used at the start of the pressure-decrease processing in response to the steady condition described above being met is the initial oil pressure (base oil pressure). According to the example shown in FIG. 6, each time when the duration T2 elapses, the target oil pressure associated with the engine operating condition subject to the pressure-decrease is decreased by the predetermined amount ΔP2.

If, thereafter, the AE maximum amplitude value becomes greater than the threshold value TH1 at a time point t1, the first pressure-increase processing is executed. As a result, the target oil pressure is increased by the predetermined amount ΔP1. In more detail, the engine operating condition subject to the pressure-increase by the first pressure-increase processing according to the present embodiment is associated with an engine operating condition (which also corresponds to the first engine operating condition) that corresponds to the steady condition that is currently met. It should be noted that the predetermined amount ΔP1 of the first pressure-increase processing and the predetermined amount ΔP2 of the pressure-decrease processing may be the same as each other or be different from each other. According to the example shown in FIG. 6, a value that is greater than the predetermined amount ΔP2 of the pressure-decrease processing is used as the predetermined amount ΔP1.

Also, according to the example shown in FIG. 6, the AE maximum amplitude value is decreased to be smaller than the threshold value TH1 as a result of the first pressure-increase processing being executed at the time point t1. Because of this, each time when the predetermined time T1 elapses after this kind of decrease is recognized, the pressure-decrease processing is executed again, and the target oil pressure is decreased by the predetermined amount ΔP2.

Moreover, according to the example shown in FIG. 6, the first pressure-increase processing is also executed at each of time points t2 and t3 thereafter. Moreover, since the AE maximum amplitude value is also decreased to be smaller than the threshold value TH1 after any of these examples of execution of the first pressure-increase processing, the pressure-decrease processing is restarted.

Furthermore, according to the example shown in FIG. 6, the first pressure-increase processing is also executed also at a time point t4 thereafter. An increase of the AE maximum amplitude value near this time point t4 is caused by an irregular event, such as contamination of foreign matter to the sliding portion S. If the AE maximum amplitude value does not decrease to be smaller than the threshold value TH1 even when the first pressure-increase processing is executed at once as in the example of the increase of this kind of AE maximum amplitude value, the first pressure-increase processing is repeatedly executed for each predetermined time period T1, provided that the target oil pressure has not yet reached the upper limit oil pressure, similarly to the first embodiment.

At a time point t5, the AE maximum amplitude value is decreased to be smaller than or equal to the threshold value TH1 as a result of the first pressure-increase processing being repeatedly executed. As a result, the pressure-decrease processing is restarted.

2-1-2. Processing of ECU Concerning Oil Pressure Control Including Pressure-Decrease Processing FIG. 7 is a flow chart that illustrates a routine of the processing concerning the oil pressure control according to the second embodiment of the present disclosure. The processing of steps S100 to S106 in the routine shown in FIG. 7 is as already described in the first embodiment.

Figure 7:
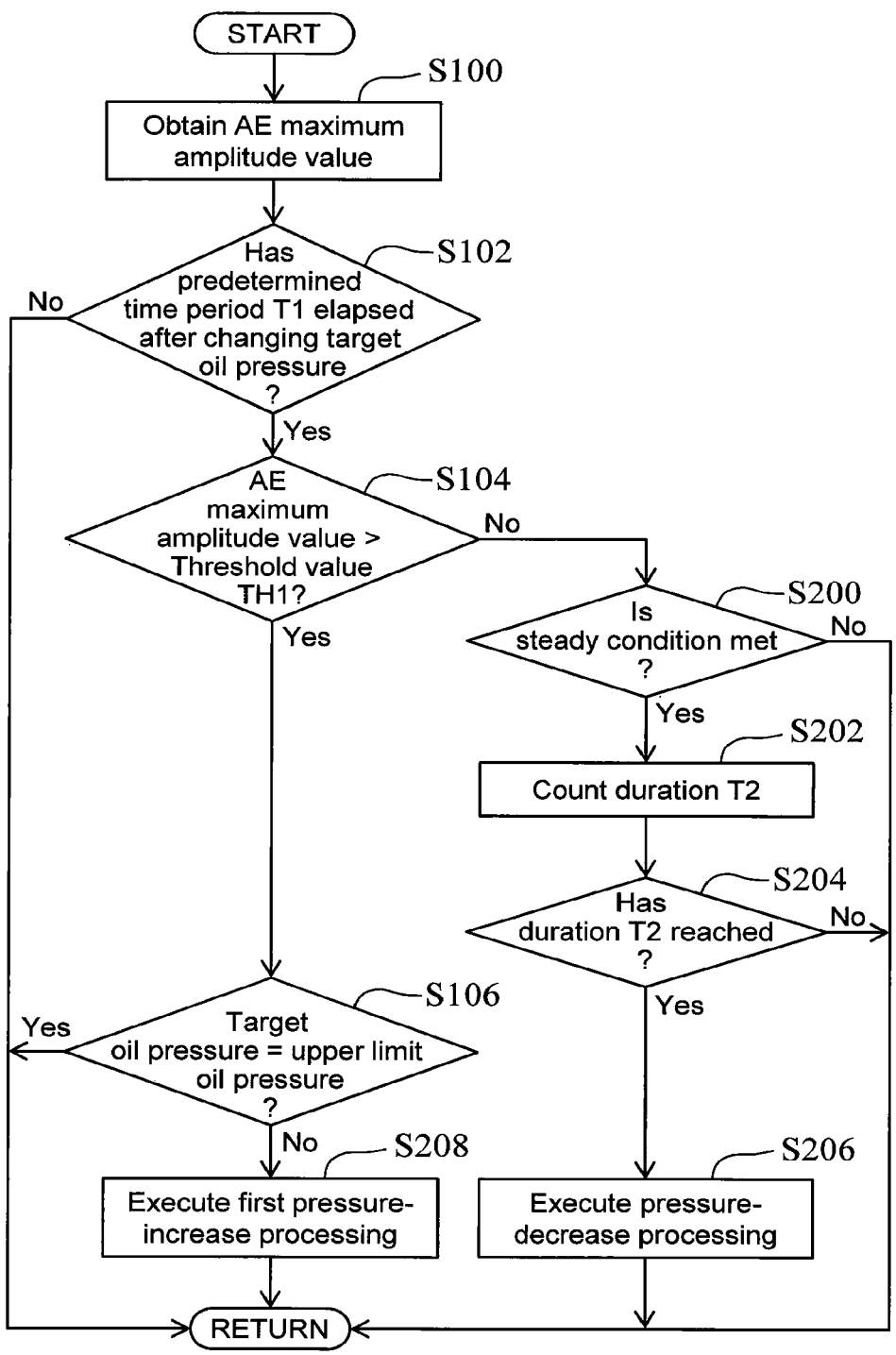
FIG. 7 is a flow chart that illustrates a routine of the processing concerning the oil pressure control according to the second embodiment of the present disclosure.

According to the routine shown in FIG. 7, the ECU 50 proceeds to step S200 after determining in step S104 that the AE maximum amplitude value has not yet become greater than the threshold value TH1. In step S200, the ECU 50 determines whether or not the steady condition described above is met. In detail, the determination as to whether or not this steady condition is met can be, for example, executed on the basis of whether or not the width of variation of each of the engine speed Ne and the engine torque correlation value is continuously smaller than or equal to a predetermine value over a predetermined time period.

If the ECU 50 determines in step S200 that the steady condition is not met, it ends the current processing cycle. If, on the other hand, the ECU 50 determines in step S200 that is the steady condition is met, it starts or continues the counting of the duration T2 of the steady condition from a time point at which the steady condition is met last. (step S202).

Next, the ECU 50 determines whether or not the duration T2 has reached a predetermine value (step S204). As a result, while the duration T2 has not yet reached the predetermine value, the ECU 50 ends the current processing cycle.

If, on the other hand, the duration T2 has reached the predetermine value, the ECU 50 executes the pressure-decrease processing (step S206). In detail, as an example, the target oil pressure associated with the engine operating condition (mainly, engine speed Ne and engine torque correlation value) that corresponds to the steady condition which is currently met is decreased by the predetermined amount ΔP2, similarly to the example shown in FIG. 6.

Furthermore, according to the routine shown in FIG. 7, after determining in step S104 that the AE maximum amplitude value has become greater than the threshold value TH1, the ECU 50 proceeds to step S208 to execute the first pressure-increase processing. The engine operating condition subject to the pressure-increase by the first pressure-increase processing executed in step S208 is the first engine operating condition. According to this kind of processing, if, similarly to the example of the operation shown in FIG. 6, the determination result of step S104 has becomes positive in the course of the pressure-decrease processing being proceeding due to the steady condition being met, the first pressure-increase processing can be executed in order to increase the target oil pressure associated with the engine operating condition subject to the pressure-decrease processing.

In addition, when the steady condition stops being met after the pressure-decrease processing is executed as a result of the steady condition being met, the value of the target oil pressure that has decreases by the pressure-decrease processing may be, for example, stored in the ECU 50. Then, a stored value of the target oil pressure may alternatively be used as the target oil pressure at the start of the pressure-decrease processing executed when the steady condition corresponding to the same engine operating condition is met again.

Alternatively, if the steady condition stops being met, the target oil pressure associated with the engine operating condition corresponding to the steady condition may be returned to the initial oil pressure (base oil pressure). Thus, even if the pressure-decrease processing is executed, it becomes possible to prevent the target oil pressure from becoming lower than the initial oil pressure after the steady condition stops being met. In addition, the processing to cause the target oil pressure to return to the initial oil pressure in this way may alternatively be executed, provided that the target oil pressure used when the steady condition stops being met is smaller than the initial oil pressure. As a result, when the target oil pressure is greater than the initial oil pressure as a result of the first pressure-increase processing being executed during the steady condition being met, the target oil pressure can be maintained high.

2-1-3. Advantageous Effects Concerning Oil Pressure Control Including Pressure-Decrease Processing As described so far, according to the oil pressure control of the present embodiment including the pressure-decrease processing in addition to the first pressure-increase processing, the reliability of the internal combustion engine 10 can be highly ensured by the first pressure-increase processing that is executed as needed, while lowering the oil pressure as much as possible at each engine operating condition by the execution of the pressure-decrease processing in order to improve the fuel efficiency.

2-2. Modification Example Concerning Second Embodiment

In the first pressure-increase processing according to the second embodiment described above, similarly to that according to the first embodiment, each time when the AE maximum amplitude value becomes greater than the threshold value TH1, the values of the target oil pressure associated with the engine operating conditions subject to the first pressure-increase processing are each increased by the predetermined amount ΔP1. However, instead of this kind of example, where the AE maximum amplitude value has become greater than the threshold value TH1, the first pressure-increase processing may alternatively be, for example, executed so as to increase the values of the target oil pressure subject to the increase to the respective values of the upper limit oil pressure at once.

Third Embodiment

Next, a third embodiment according to the present disclosure and a modification example thereof will be described with reference to FIGS. 8 to 10.

3-1. Oil Pressure Control According to Third Embodiment

The oil pressure control according to the present embodiment is different from the oil pressure control according to the second embodiment in terms of the oil pressure control being executed along with the following "operation limit processing".

The operation limit processing described above is executed, where the AE maximum amplitude value which corresponds to an example of the AE correlation value becomes greater than a threshold value TH2 that is greater than the threshold value TH1. The threshold value TH2 corresponds to an example of the "second threshold value" according to the present disclosure. FIG. 8 is a graph for describing an engine operating condition subject to limit by the operation limit processing.

Figure 8:
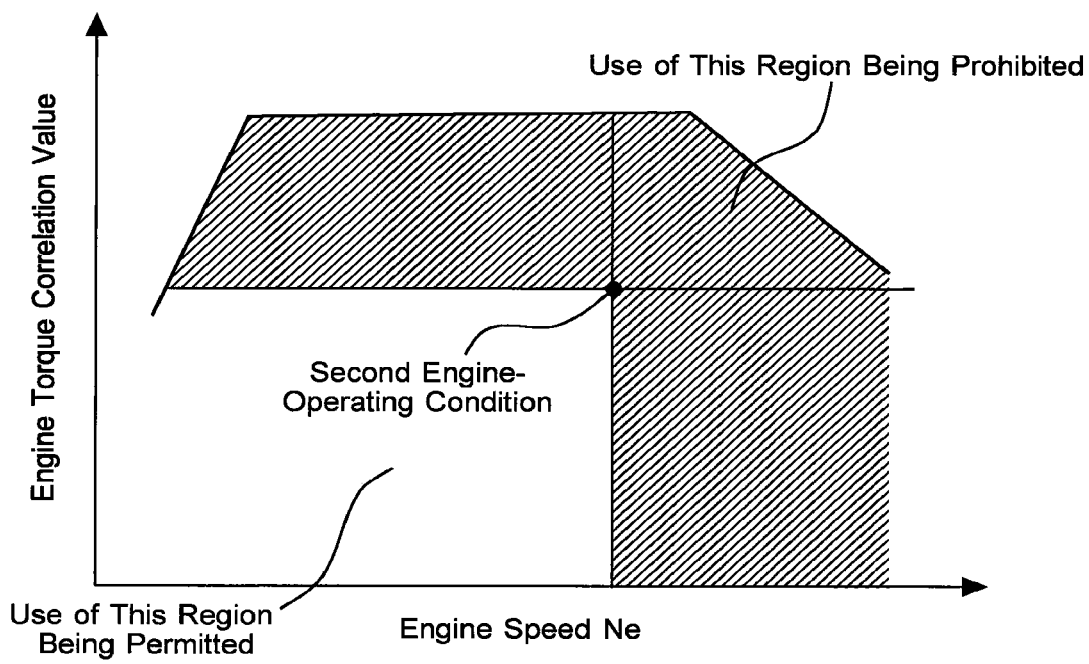
FIG. 8 is a graph for describing an engine operating condition subject to limit by an operation limit processing.

According to the operation limit processing, as shown in FIG. 8, the operation of the internal combustion engine 10 is limited such that the internal combustion engine 10 is operated in an engine operating region in which each of the engine speed Ne and the engine torque correlation value is lower than that in an engine operating condition (for each of explanation, referred to as a "second engine operating condition") present when the AE maximum amplitude value becomes greater than the threshold value TH2. That is to say, the use of the engine operating point associated with the second engine operating condition and the use of the engine operating region in which at least one of the engine speed Ne and the engine torque correlation value is higher than that in the second engine operating condition are prohibited.

Moreover, according to the present embodiment, when the operation limit processing is executed, the MIL 62 is turned ON to announce abnormality of the sliding portion S to the driver of the vehicle on which the internal combustion engine 10 is mounted.

3-1-1. Example of Operation in which Execution Condition of Operation Limit Processing is Met FIG. 9 is a time chart that illustrates an example of the operation of the oil pressure control according to the third embodiment of the present disclosure, which is executed along with the operation limit processing. According to the example shown in FIG. 9, the oil pressure control is executed under the condition that the steady condition is continuously met, similarly to the example shown in FIG. 6. Hereunder, the following description on the example shown in FIG. 9 will be focused on the difference with respect to the example shown in FIG. 6.

Figure 9:
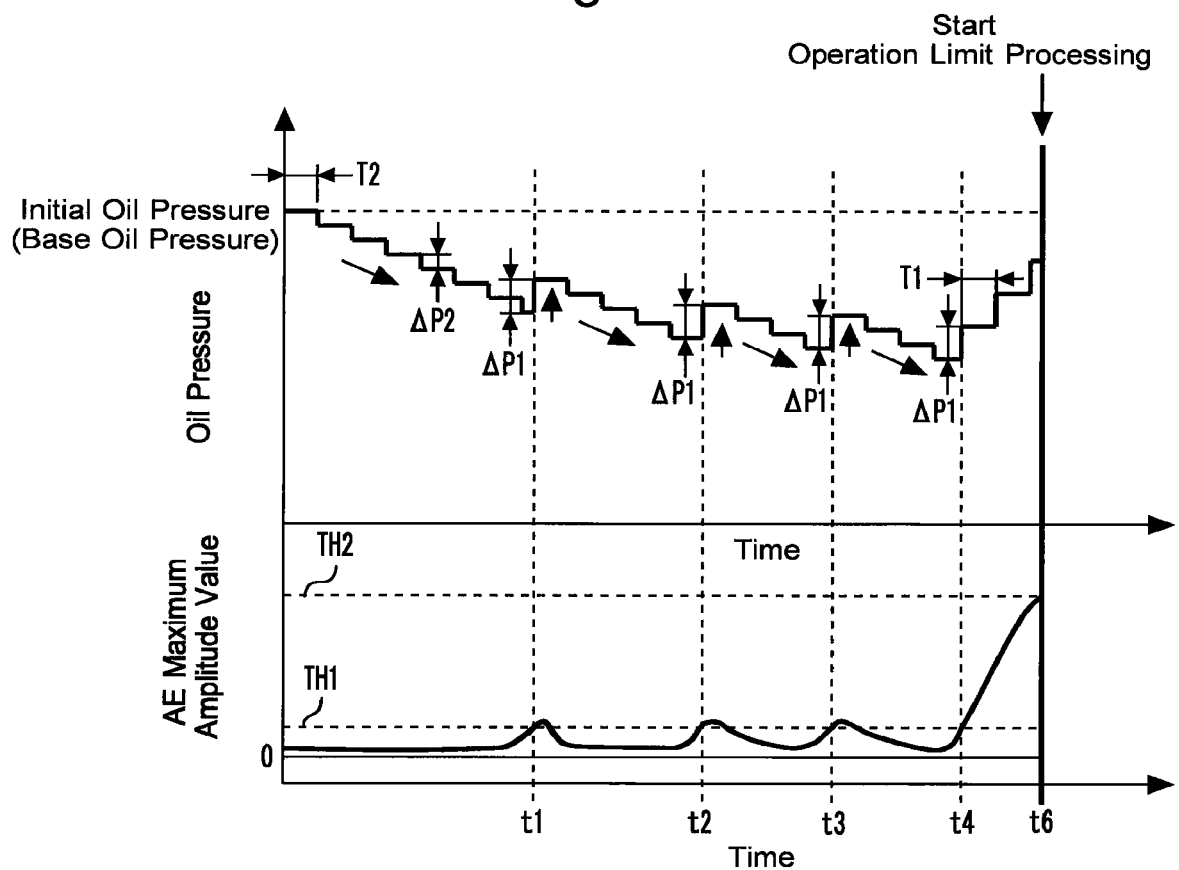
FIG. 9 is a time chart that illustrates an example of an operation of an oil pressure control according to a third embodiment of the present disclosure, which is executed along with the operation limit processing.

According to the example shown in FIG. 9, at a time point t6 after the time point t4, the AE maximum amplitude value becomes greater than the threshold value TH2. That is to say, at the time point t6, an execution condition of the operation limit processing described above is met. Thus, after the time point t6, the operation of the internal combustion engine 10 stops being performed under the engine operating condition (engine speed Ne and engine torque correlation value) associated with the example shown in FIG. 9 due to the execution of the operation limit processing.

3-1-2. Processing of ECU Concerning Oil Pressure Control and Operation Limit Processing FIG. 10 is a flow chart that illustrates a routine of the processing concerning the oil pressure control and the operation limit processing according to the third embodiment of the present disclosure. The processing of steps S100 to S106 and S200 to S208 in the routine shown in FIG. 10 is as already described in the first and second embodiments.

Figure 10:
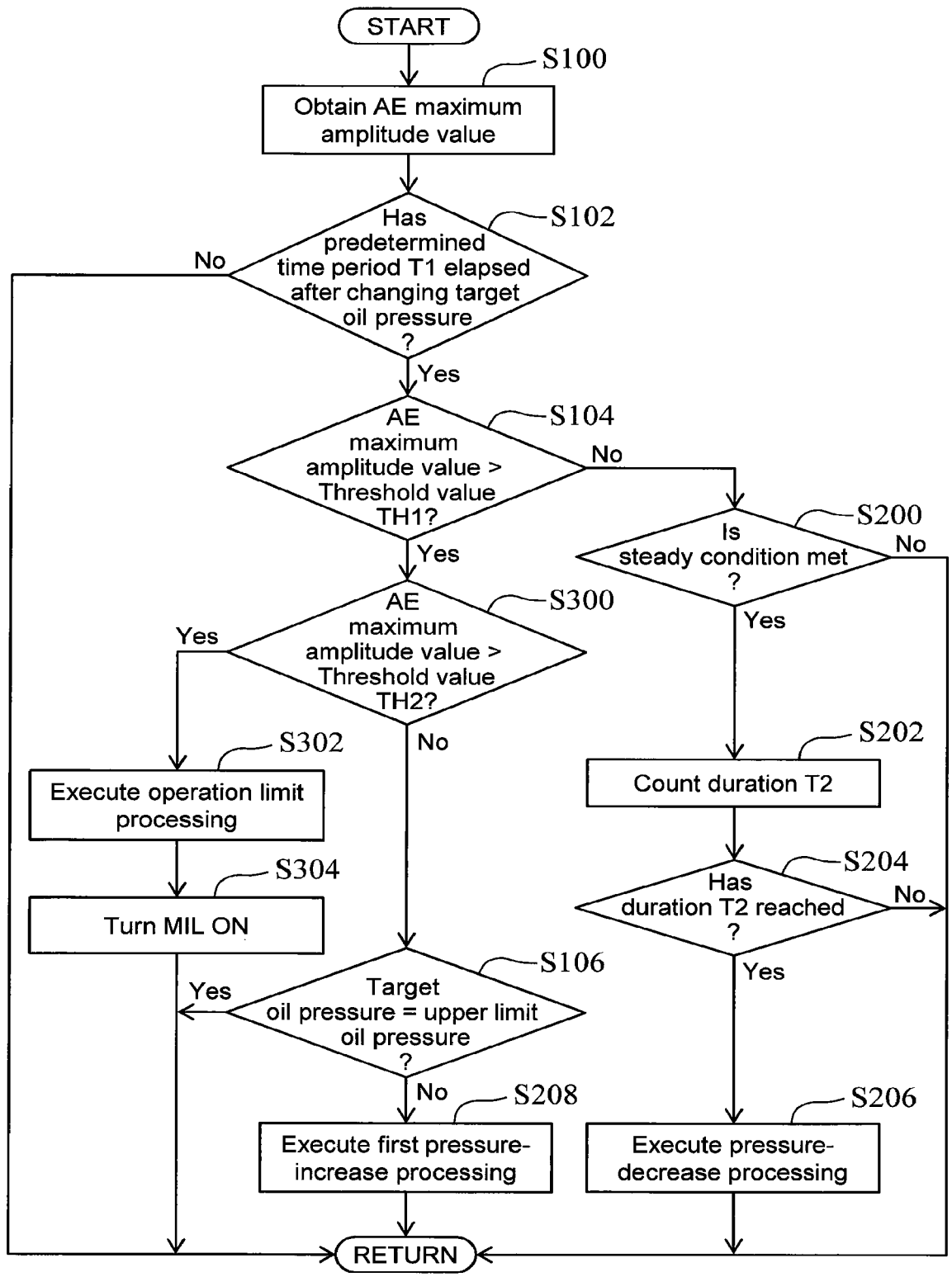
FIG. 10 is a flow chart that illustrates a routine of the processing concerning the oil pressure control and the operation limit processing according to the third embodiment of the present disclosure.

According to the routine shown in FIG. 10, the ECU 50 proceeds to step S300 after determining in step S104 that the AE maximum amplitude value has become greater than the threshold value TH1. In step S300, the ECU 50 determines whether or not the AE maximum amplitude value has become greater than the threshold value TH2. The threshold value TH2 is greater than the threshold value TH1 as described above. Because of this, by the use of this kind of threshold value TH2, it can be judged that the AE wave that shows such a change as to provoke greater concern with respect to the decrease in reliability of the internal combustion engine 10 (i.e., with respect to the occurrence of abnormality) has been detected.

If the determination result of step S300 is negative (AE maximum amplitude value≤threshold value TH2), the ECU 50 executes the first pressure-increase processing (step S208), provided that the target oil pressure has not yet reached the upper limit oil pressure (step S106).

If, on the other hand, the result of the determination of step S300 becomes positive (AE maximum amplitude value>threshold value TH2), the ECU 50 executes the operation limit processing described above (step S302). In an example of the internal combustion engine 10 that is a spark ignition engine, the limit of the engine operating region by the operation limit processing can be, for example, performed by limiting the intake air flow rate to be low by the use of a limit of the opening degree of the throttle valve 60 or by limiting the fuel injection amount to be less. In addition, in an example of a compression ignition engine, the limit described above can be, for example, performed by limiting the fuel injection amount to be less.

Next, the ECU 50 turns ON the MIL 62 to announce the abnormality concerning the sliding portion S to the driver of the vehicle.

3-1-3. Advantageous Effects Concerning Oil Pressure Control Accompanied by Operation Limit Processing As described so far, according to the control of the present embodiment in which the oil pressure control accompanied by the operation limit processing is performed, when the AE maximum amplitude value becomes greater than the threshold value TH2 that is greater than the threshold value TH1, the operation limit processing is executed. That is to say, where the AE wave that shows such a change as to provoke greater concern with respect to the decrease in reliability of the internal combustion engine 10 (i.e., with respect to the occurrence of abnormality) has been detected, the engine operating region is limited such that the operation that uses the engine speed Ne and the engine torque correlation value that are lower than those at an engine operating condition (i.e., at the second engine operating condition) in which this kind of AE wave is detected is performed. Therefore, according to the control of the present embodiment, even when a significant increase of the AE maximum amplitude value is recognized, the oil pressure control that achieves the similar advantageous effects to those of the second embodiment can be performed while reducing the decrease in reliability of the internal combustion engine 10 by the use of the operation limit control.

3-2. Modification. Example Concerning Third Embodiment

The operation limit processing according to the third embodiment described above may be combined with an oil pressure control including the first pressure-increase processing without the pressure-decrease processing similarly to that according to the first embodiment, instead of the oil pressure control including the pressure-decrease processing as well as the first pressure-increase control similarly to that according to the second embodiment.

Fourth Embodiment

Next, a fourth embodiment according to the present disclosure and modification examples thereof will be described with reference to FIG. 11.

4-1. Oil Pressure Control According to Fourth Embodiment

The oil pressure control according to the present embodiment is different from the oil pressure control according to the first embodiment in terms of including the following "failure detection processing" and "second pressure-increase processing" as well as the first pressure-increase processing.

4-1-1. Outline of Failure Detection Processing and Second Pressure-Increase Processing The failure detection processing according to the present embodiment is executed to detect a failure of the elastic wave sensor 40. More specifically, as already described in the first embodiment, if the internal combustion engine 10 is in operation, the AE signal (electric voltage) does not continuously become zero and has a small value even when an increase of the friction at the sliding potion S has not yet proceeded. Because of this, if the elastic wave sensor 40 is normal, the output of the elastic wave sensor 40 will not be zero steadily. Therefore, whether or not a failure (in more detail, disconnection of wire) of the elastic wave sensor 40 occurs can be determined on the basis of, for example, whether or not the AE signal continuously shows a zero over a predetermined time period.

When a failure of the elastic wave sensor 40 is detected by the failure detection processing, the second pressure-increase processing according to the present embodiment increases the target oil pressure associated with the same engine operating condition, as compared to when the failure does not occur.

4-1-2. Processing of ECU Concerning Oil Pressure Control Including Second Pressure-Increase Processing Based on Failure Detection Processing FIG. 11 is a flow chart that illustrates a routine of the processing concerning the oil pressure control according to the fourth embodiment of the present disclosure. The processing of steps S100 to S108 in the routine shown in FIG. 11 is as already described in the first embodiment.

Figure 11:
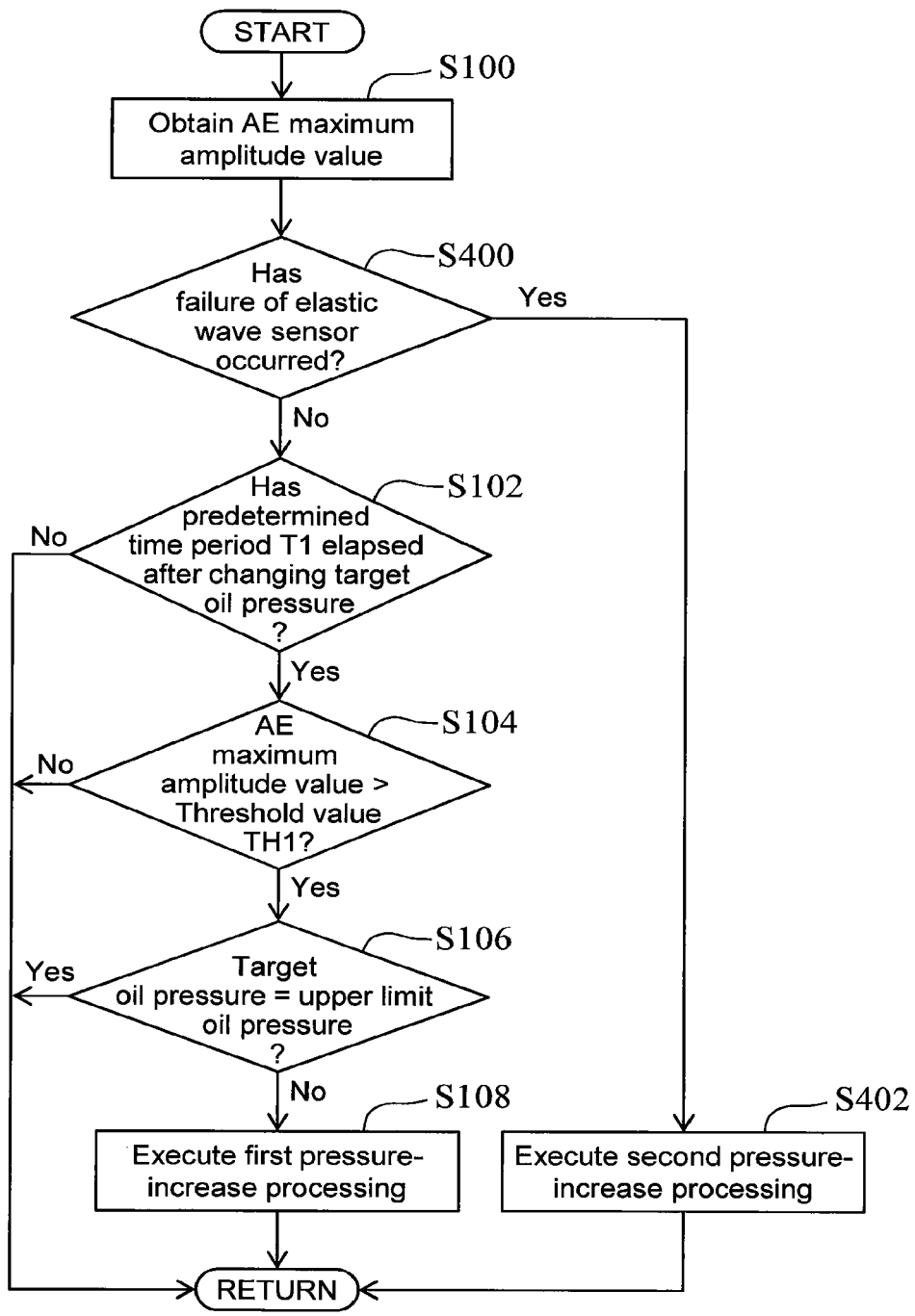
FIG. 11 is a flow chart that illustrates a routine of the processing concerning an oil pressure control according to a fourth embodiment of the present disclosure.

According to the routine shown in FIG. 11, the ECU 50 proceeds to step S400 after obtaining the AE maximum amplitude value in step S100. In step S400, the ECU 50 executes to the failure detection processing described above to determine whether or not a failure of the elastic wave sensor 40 has occurred.

If the ECU50 determines in step S400 that a failure of the elastic wave sensor 40 has not occurred, it proceeds to step S102. If, on the other hand, the ECU 50 determines in step S400 that a failure of the elastic wave sensor 40 has occurred, it proceeds to step S402 to execute the second pressure-increase processing.

To be more specific, according to the second pressure-increase processing, the ECU 50 causes the values of the target oil pressure associated with all of (i.e., the individual) engine operating conditions to increase to the respective values of the upper limit oil pressure, as an example. It should be noted that the second pressure-increase processing may alternatively increase each value of the target oil pressure so as to cause it to coincide with a predetermined value that is lower than the upper limit oil pressure, instead of this kind of example.

4-1-3. Advantageous Effects Concerning Oil Pressure Control Including Second Pressure-Increase Processing Based on Failure Detection Processing As described so far, according to the second pressure-increase processing of the present embodiment, where it is determined that a failure of the elastic wave sensor 40 has occurred, the values of the target oil pressure associated with the same engine operating conditions are each increased as compared to where a failure of the elastic wave sensor 40 has not occurred. As a result, the oil pressure can be controlled in a safe manner in terms of ensuring the reliability of the internal combustion engine 10 under the condition that determination on the abnormality (seizure) of the sliding portion S is no longer able to be performed due to the failure of the elastic wave sensor 40. Also, this kind of advantageous effects can be made more superior by applying the second pressure-increase processing to all the engine operating conditions, as in the example of the routine shown in FIG. 11.

4-2. Modification Examples Concerning Fourth Embodiment

The second pressure-increase processing based on the failure detection processing according to the fourth embodiment described above may be combined with the oil pressure control according to the second or third embodiment, instead of the oil pressure control according to the first embodiment.

(Other Examples of "AE Correlation Value")

In the first to fourth embodiments described above, the AE maximum amplitude value is used as an example of the "AE correlation value" correlated with the strength or occurrence frequency of the AE wave detected by the elastic wave sensor 40. However, in order to obtain the "AE correlation value" according to the present disclosure, the signal intensity of the elastic wave sensor 40 (i.e., signal intensity of AE wave) in a designated frequency range may alternatively be, for example, used as described with reference to FIG. 12 described below, instead of the example described above.

Figure 12:
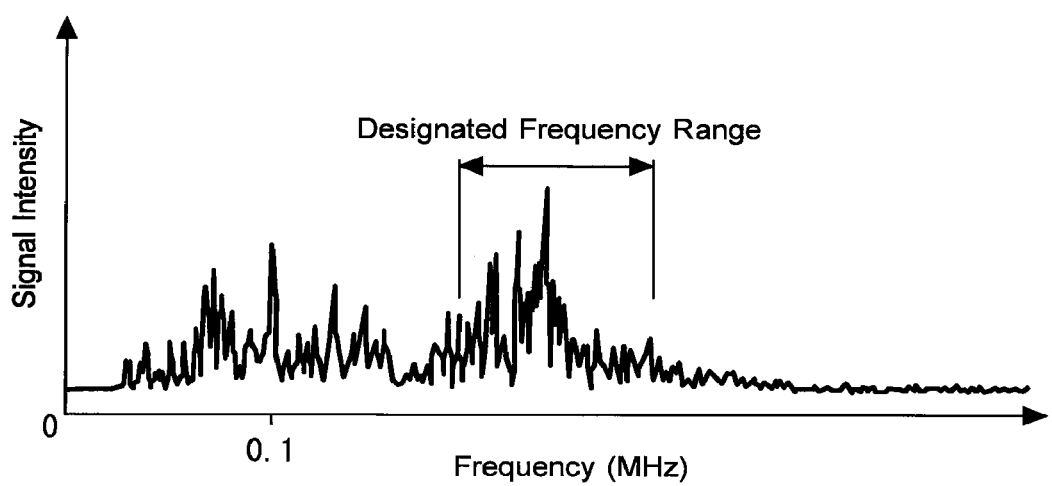
FIG. 12 is a graph for describing another example of the AE correlation value.

FIG. 12 is a graph for describing another example of the AE correlation value. FIG. 12 represents an example of the results of a frequency analysis for the AE signal waveform. Main frequency range of the AE wave is known (for example, several kHz to several MHz), and the "designated frequency range" shown in FIG. 12 is selected from this kind of frequency range. Another example of the "AE correlation value" may be a value concerning the signal intensity of the elastic wave sensor 40 in this kind of designated frequency range (for example, peak value or integrated value of the signal intensity in this designated frequency range).

Moreover, as yet another example of the "AE correlation value", an AE average value or AE effective value may be used as follows. More specifically, an envelope detection waveform is obtained by performing half-wave rectification of the negative portion of an AE signal waveform that is a waveform of an alternating-current signal of the electric voltage altering between positive and negative values as shown in FIG. 3 and performing envelope detection on the waveform after the half-wave rectification. The AE average value corresponds to a value obtained by performing an averaging processing with respect to this envelope detection waveform. In addition, the AE effective value corresponds to a root-mean-square value (RMS value) concerning this envelope detection waveform.

Furthermore, as still another example, an AE counting rate may be used. The AE counting rate is a time rate of the number of times of the AE signal exceeding a threshold value during a designated time period (AE counting), which can be calculated by the use of, for example, the envelope detection waveform described above. This kind of AE counting rate is one of the values correlated with the occurrence frequency of the AE wave.

The embodiments and modification examples described above may be combined in other ways than those explicitly described above as required and may be modified in various ways without departing from the scope of the present disclosure.

What is claimed is:

1. A control device for an internal combustion engine, the internal combustion engine including:
an elastic wave sensor configured to output a signal responsive to a strength of an acoustic emission wave produced at a sliding portion of the internal combustion engine; and
a variable oil pump configured to change an oil pressure of oil lubricating the sliding portion,
wherein the control device is configured to execute an oil pressure control for controlling the variable oil pump such that the oil pressure approaches a target oil pressure according to an engine operating condition,
wherein the oil pressure control includes a first pressure-increase processing executed where an acoustic emission (AE) correlation value, correlated with the strength of the acoustic emission wave detected by the elastic wave sensor or an occurrence frequency of the acoustic emission wave detected by the elastic wave sensor, is greater than a first threshold value,
wherein the first pressure-increase processing increases a target oil pressure associated with a first engine operating condition present when the AE correlation value becomes greater than the first threshold value, as compared to when the AE correlation value is smaller than or equal to the first threshold value, and
wherein the first pressure-increase processing increases not only the target oil pressure associated with the first engine operating condition but also a target oil pressure associated with an engine operating condition included in an engine operating region in which at least one of an engine speed and an engine torque correlation value is higher than that at the first engine operating condition.

2. The control device according to claim 1, wherein the elastic wave sensor is attached to a crank cap of a cylinder of the internal combustion engine.

3. A control device for an internal combustion engine, the internal combustion engine including:
an elastic wave sensor configured to output a signal responsive to a strength of an acoustic emission wave produced at a sliding portion of the internal combustion engine; and
a variable oil pump configured to change an oil pressure of oil lubricating the sliding portion,
wherein the control device is configured to execute an oil pressure control for controlling the variable oil pump such that the oil pressure approaches a target oil pressure according to an engine operating condition,
wherein the oil pressure control includes a first pressure-increase processing executed where an acoustic emission (AE) correlation value, correlated with the strength of the acoustic emission wave detected by the elastic wave sensor or an occurrence frequency of the acoustic emission wave detected by the elastic wave sensor, is greater than a first threshold value,
wherein the first pressure-increase processing increases a target oil pressure associated with a first engine operating condition present when the AE correlation value becomes greater than the first threshold value, as compared to when the AE correlation value is smaller than or equal to the first threshold value, and
wherein the oil pressure control includes a pressure-decrease processing that, where a steady condition that an engine speed and an engine torque correlation value are constant or substantially constant with respect to a lapse of time is met, decreases, with a lapse of time, a target oil pressure associated with an engine operating condition at the steady condition being met.

4. The control device according to claim 3, wherein the elastic wave sensor is attached to a crank cap of a cylinder of the internal combustion engine.

5. A control device for an internal combustion engine, the internal combustion engine including:
an elastic wave sensor configured to output a signal responsive to a strength of an acoustic emission wave produced at a sliding portion of the internal combustion engine; and
a variable oil pump configured to change an oil pressure of oil lubricating the sliding portion,
wherein the control device is configured to execute an oil pressure control for controlling the variable oil pump such that the oil pressure approaches a target oil pressure according to an engine operating condition,
wherein the oil pressure control includes a first pressure-increase processing executed where an acoustic emission (AE) correlation value, correlated with the strength of the acoustic emission wave detected by the elastic wave sensor or an occurrence frequency of the acoustic emission wave detected by the elastic wave sensor, is greater than a first threshold value,
wherein the first pressure-increase processing increases a target oil pressure associated with a first engine operating condition present when the AE correlation value becomes greater than the first threshold value, as compared to when the AE correlation value is smaller than or equal to the first threshold value,
wherein the control device is configured, where the AE correlation value is greater than a second threshold value that is greater than the first threshold value, to execute an operation limit processing, and
wherein the operation limit processing limits operation of the internal combustion engine such that the internal combustion engine is operated in an engine operating region in which each of an engine speed and an engine torque correlation value is lower than that at a second engine operating condition present when the AE correlation value becomes greater than the second threshold value.

6. The control device according to claim 5, wherein the elastic wave sensor is attached to a crank cap of a cylinder of the internal combustion engine.

7. A control device for an internal combustion engine, the internal combustion engine including:
an elastic wave sensor configured to output a signal responsive to a strength of an acoustic emission wave produced at a sliding portion of the internal combustion engine; and
a variable oil pump configured to change an oil pressure of oil lubricating the sliding portion,
wherein the control device is configured to execute an oil pressure control for controlling the variable oil pump such that the oil pressure approaches a target oil pressure according to an engine operating condition,
wherein the oil pressure control includes a first pressure-increase processing executed where an acoustic emission (AE) correlation value, correlated with the strength of the acoustic emission wave detected by the elastic wave sensor or an occurrence frequency of the acoustic emission wave detected by the elastic wave sensor, is greater than a first threshold value,
wherein the first pressure-increase processing increases a target oil pressure associated with a first engine operating condition present when the AE correlation value becomes greater than the first threshold value, as compared to when the AE correlation value is smaller than or equal to the first threshold value, wherein the control device is configured to execute a failure detection processing for detecting a failure of the elastic wave sensor, and wherein the oil pressure control includes a second pressure-increase processing that, where the failure has been detected by the failure detection processing, decreases the target oil pressure associated with a same engine operating condition, as compared to when the failure has not occurred.

8. The control device according to claim 7, wherein the elastic wave sensor is attached to a crank cap of a cylinder of the internal combustion engine.

* * * * *